(12) United States Patent
Carrier

(10) Patent No.: US 8,640,356 B2
(45) Date of Patent: Feb. 4, 2014

(54) TAPE MEASURE END PIECE

(76) Inventor: Darrin F. Carrier, Webster, MA (US)

( * ) Notice: Subject to any disclaimer, the term of this patent is extended or adjusted under 35 U.S.C. 154(b) by 102 days.

(21) Appl. No.: 13/533,212

(22) Filed: Jun. 26, 2012

(65) Prior Publication Data

US 2013/0255093 A1 Oct. 3, 2013

Related U.S. Application Data

(60) Provisional application No. 61/616,767, filed on Mar. 28, 2012.

(51) Int. Cl.
*G01B 3/10* (2006.01)

(52) U.S. Cl.
USPC ............................................. 33/770; 33/758

(58) Field of Classification Search
USPC .................... 33/758, 759, 760, 768, 769, 770
See application file for complete search history.

(56) References Cited

U.S. PATENT DOCUMENTS

| RE14,947 | E  | * | 9/1920  | Ballou ............................. 33/758 |
| 6,108,926 | A  | * | 8/2000  | Fraser et al. .................... 33/768 |
| 6,349,483 | B1 | * | 2/2002  | Dodge, Sr. ....................... 33/770 |
| 7,596,881 | B1 | * | 10/2009 | Bourgeois ........................ 33/770 |
| 7,854,074 | B2 | * | 12/2010 | Zhou ................................ 33/758 |
| 7,918,037 | B1 | * | 4/2011  | Polkhovskiy .................... 33/758 |
| 2001/0042315 | A1 | * | 11/2001 | Dixon ............................. 33/758 |
| 2011/0167660 | A1 | * | 7/2011  | Furrow ........................... 33/759 |
| 2013/0255093 | A1 | * | 10/2013 | Carrier ............................ 33/770 |

* cited by examiner

*Primary Examiner* — Yaritza Guadalupe-McCall
(74) *Attorney, Agent, or Firm* — Sinorica, LLC

(57) ABSTRACT

The present invention is an attachment to the end of a measuring tape. The attachment is made from one piece of material wherein all the components are continuously connected. The tape measure end piece has a rounded bottom, a straight tongue, and a pair of front round tabs. The straight tongue allows the present invention to be attached to the blade of a measuring tape via a plurality of rivet holes to the rivets situated on the blade of the measuring tape. The plurality of rivet holes allows the position of the end piece to be adjustable along the end of the tape measure. The rounded bottom of the present invention allows the present invention and the end of the measure tape to travel over uneven surfaces at a distance. The pair of front round tabs allows the present invention to be hooked onto objects at a distance during measurement.

16 Claims, 6 Drawing Sheets

TAPE MEASURE END PIECE

The current application claims a priority to the U.S. Provisional Patent Application Ser. No. 61/616,767 filed on Mar. 28, 2012.

FIELD OF THE INVENTION

The present invention relates generally to an end piece attachment to the end of a measuring tape. The present invention allows measurements to be made over uneven surfaces at long distances.

BACKGROUND OF THE INVENTION

Uneven surfaces such as shingled roofs can be difficult to measure with an ordinary measure tape. The present invention allows measurements of a house roof to be made by the user when he or she is simply standing on top of a ladder. The present invention is designed not only for roof measurements but also for measurements involve the end of the measure tape travelling over jagged and uneven surfaces. The present invention comprises a flat surface which is perpendicular to the measuring tape to allow accurate measurements when the present invention along with the end of the measure tape are pushed against an object. The present invention comprises a rounded bottom which allows the present invention and the end of the measure tape to travel over uneven and curved surfaces such as shingled roofs. The present invention further comprises a pair of front round tabs which allows the present invention to be hooked onto an object for easy measurements. The lightness of the present invention prevents the present invention and the end of the measure tape from moving in undesired directions.

DETAILED DESCRIPTION OF THE INVENTION

All illustrations of the drawings are for the purpose of describing selected versions of the present invention and are not intended to limit the scope of the present invention.

Figure 1:
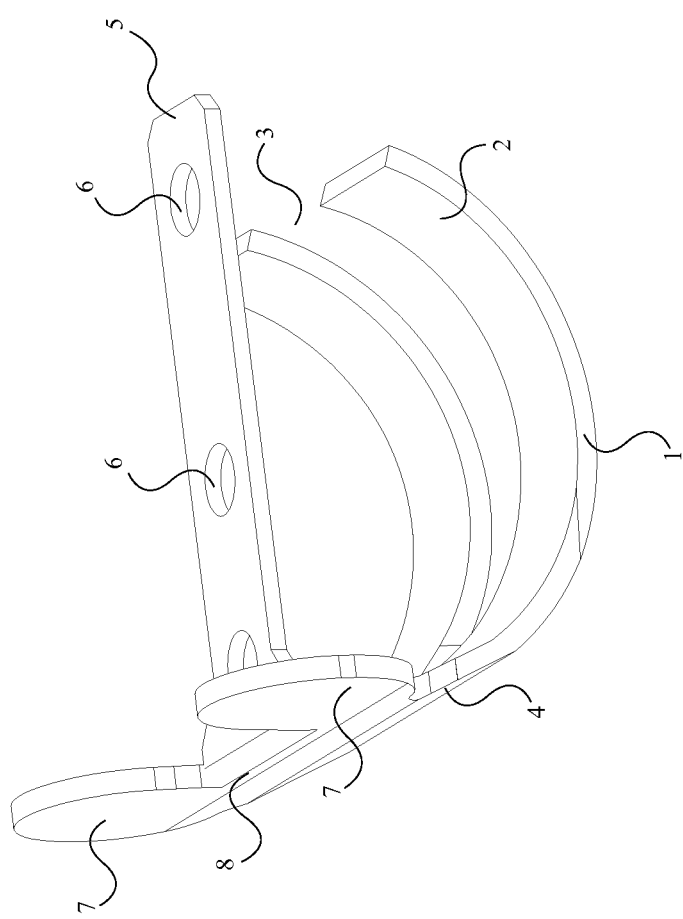
FIG. 1 is a perspective view of the preferred embodiment of the present invention.
Figure 2:
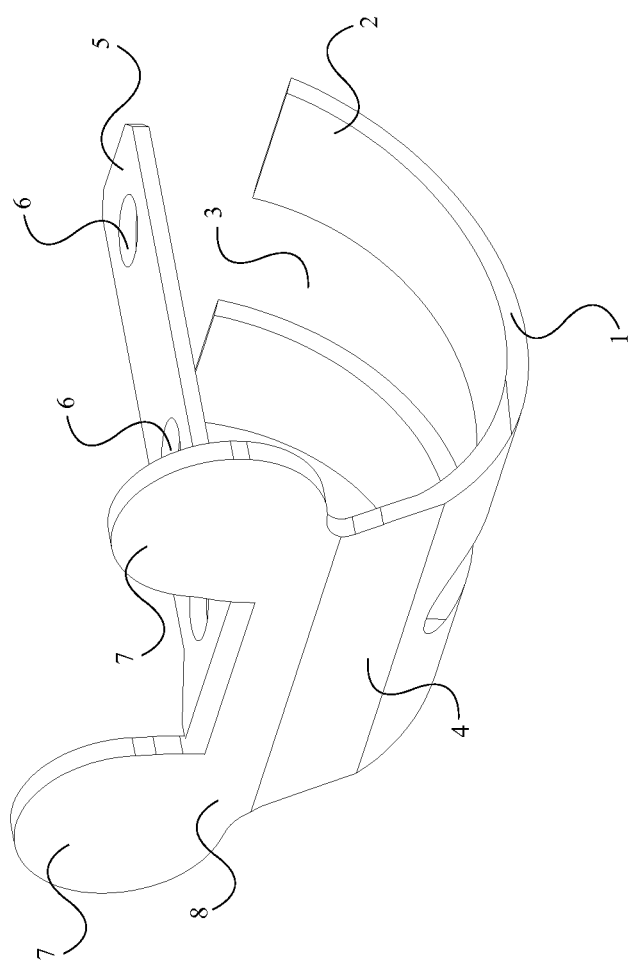
FIG. 2 is another perspective view of the preferred embodiment of the present invention.
Figure 3:
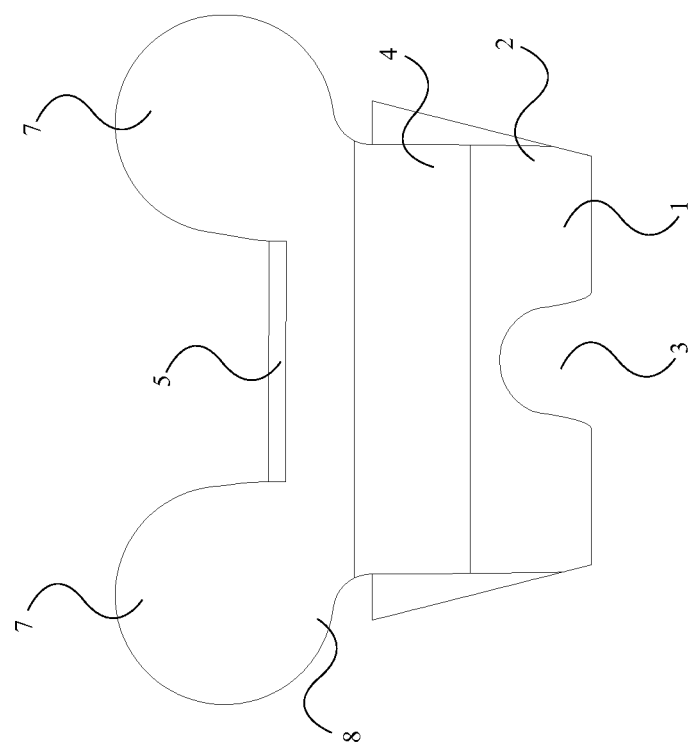
FIG. 3 is a front view of the preferred embodiment of the present invention.
Figure 5:
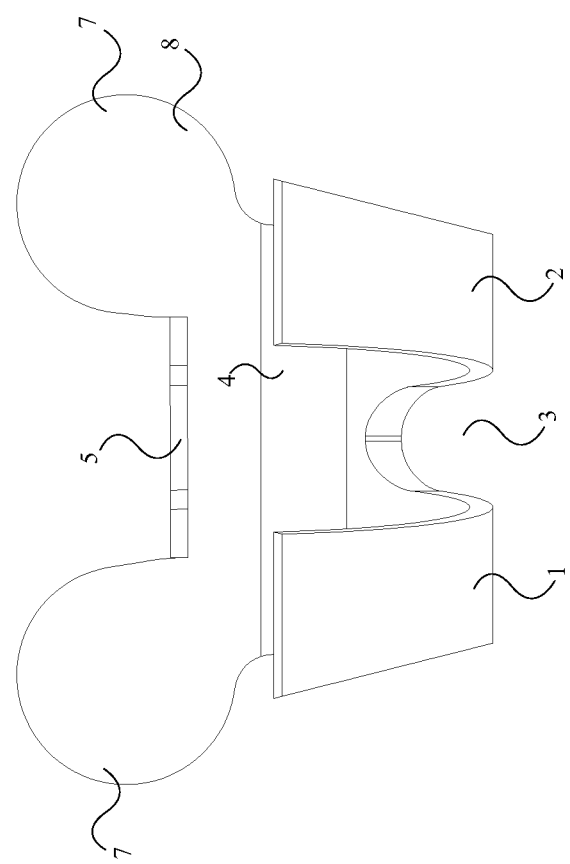
FIG. 5 is rear view of the preferred embodiment of the present invention.
Figure 6:
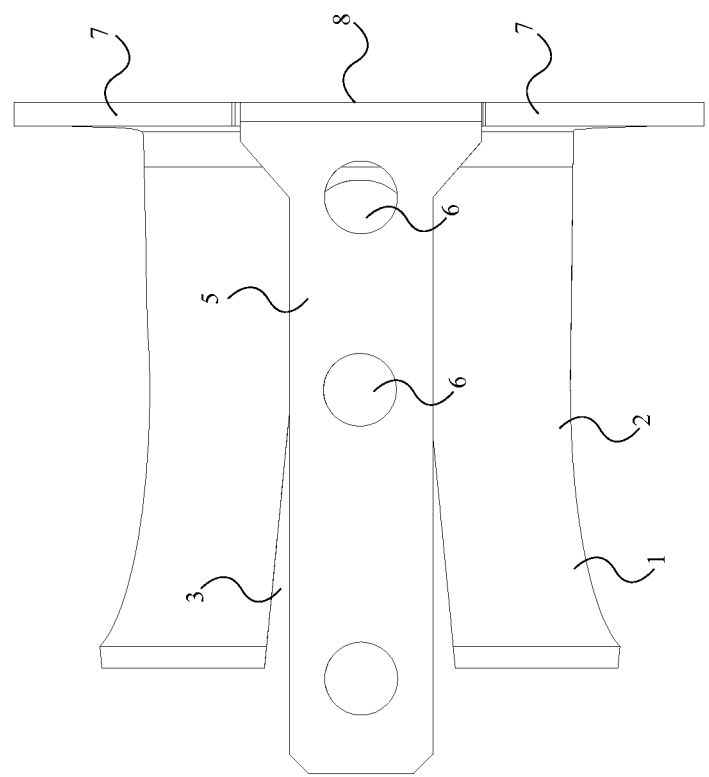
FIG. 6 is a top view of the preferred embodiment of the present invention.

The present invention is a tape measure end piece made from one piece of material. Therefore, all the components described hereinafter are continuously connected. The materials include but are not limited to various types of malleable sheet metal such as aluminum and stainless steel. Furthermore, the present invention does not comprise attached or moving parts. Since the present invention has been created from one piece of material, manufacturing the present invention is an inexpensive process. As shown in FIG. 1, the present invention comprises a rounded bottom 1, a straight tongue 5, and a pair of front round tabs 7. The present invention is designed to pass easily over uneven surfaces such as curved shingled roofs once the present invention is attached to an end of the measure tape. The rounded bottom 1 comprises an arced body 2 and a slit 3, which traverses centrally through the arced body 2. With the slit 3 traversed through the arced body 2, the rounded bottom 1 consequently shows a pair of arced flanges. As shown in FIG. 3, FIG. 5, and FIG. 6, the arced flanges of the rounded bottom 1 are slightly spread outwards. In the preferred embodiment, the slit 3 is positioned under to the straight tongue 5. Moreover the slit curves along the curvature of the rounded bottom 1. The addition of the slit 3 to the rounded bottom 1 allows extra weight of the material thereof to be removed so the present invention is lighter to use. A light tape measure end piece prevents the present invention from being too heavy once the present invention is attached to the end of the measure tape. Furthermore, the lightness of the present invention prevents the end of the measure tape from moving in unpredictable directions and allows the user to have more control over both the end of the measure tape and the tape measure end piece.

Figure 4:
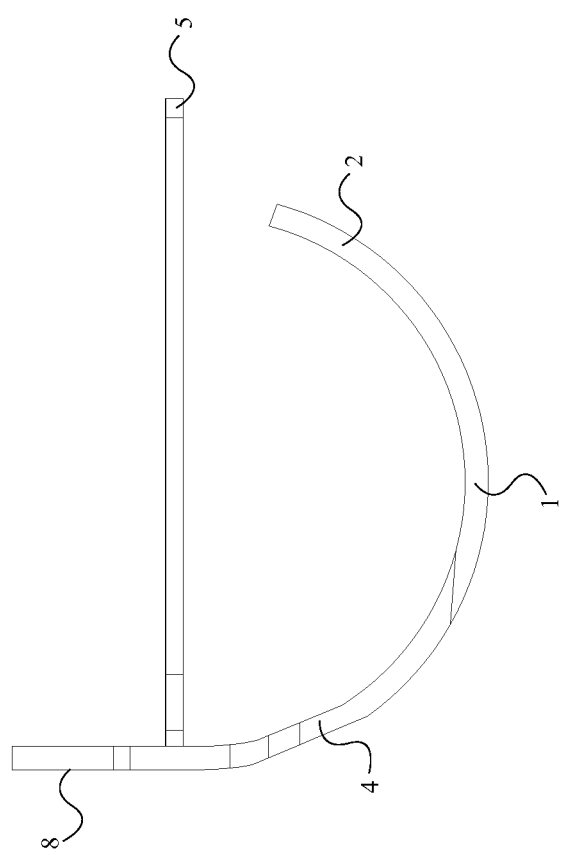
FIG. 4 is a side view of the preferred embodiment of the present invention.

In the preferred embodiment, the straight tongue 5 is positioned perpendicularly to the pair of front round tabs 7 as shown in FIG. 4. The straight tongue 5 serves as an attachment point for the present invention and the end of the tape measure. Furthermore, the straight tongue 5 is positioned tangent to the rounded bottom 1 so the straight tongue 5 can be retracted into the body of the measure tape along with the end of the measure tape. The straight tongue 5 is continuously connected to the pair of front round tabs 7, which comprise a flat surface 8. The flat surface 8 of the pair of front round tabs 7 gives the pair of front round tabs 7 a 90 degree angle with the straight tongue 5 and the measuring tape. As the pair of front round tabs 7 descends from the straight tongue 5 and the measuring tape, the pair of front round tabs 7 bends inward and arcs toward the straight tongue 5 and the measuring tape to form the rounded bottom 1. Therefore, the rounded bottom 1 is continuously connected to the pair of front round tabs 7. The flat surface 8 of the pair of front round tabs 7 is flush with an outer lateral surface of the rounded bottom 1. The flat surface 8 of the pair of front round tabs 7 allows the present invention to measure flat surfaces which are parallel to the flat surface 8. The rounded bottom 1 allows the present invention to pass easily over uneven surfaces. From FIG. 1 to FIG. 4, there is a flat portion 4 connecting the pair of front round tabs 7 to the rounded bottom 1. The flat portion 4 is descended from the 90 degree angle of the pair of front round tabs 7 and is slightly angled inward to form a slope before becoming the curvature of the arced flanges of the rounded bottom 1. The flat portion 4 and along the spread out arced flanges of the rounded bottom 1 allow the present invention to correct itself as the present invention travels along uneven surfaces such as a shingled roof. Shingled roofs are not only uneven vertically but also horizontally.

The pair of front round tabs 7 serves as a weight and a counter-weight as well as a hooking mechanism for the present invention to be attached onto objects for measurements. The pair of front round tabs 7 is preferably round so the user may use the present invention in scribing lines and cutting drywall with more ease and convenience. In building trades, it is a common practice to use the end of the tape measure as a cutting or a scribing tool. This is done when a trades person holds the body of the tape measure in one hand and the end of the measure tape along with a pencil or a utility knife against the end of the measure tape in the other hand. Then scribing a pencil mark or scoring a sheet of sheetrock is achieved once the user slides the hand with the tape measure body down the side of the board or such with the hand holding the end of the tape measure. The pair of front round tabs 7 makes it easier for the trades person to hold a pencil or a utility knife to the end of the measure tape. Moreover, the pair of front round tabs 7 allows the edge of the tape measure end piece to travel with the pencil or the utility knife against and along surfaces such as plywood and sheetrock. The pair of front round tabs 7 also serves as a good thumb hold for utility knife work, which allows drywall installers to cut their sheets. Furthermore, the pair of front round tabs 7 is used for attaching the end of the tape measure onto an object to either left or right of the measuring tape. Alternatively, the pair of front round tabs 7 can be hooked onto an object for measuring with a steady hold of the measuring object.

The pair of front round tabs 7 is separated by a space wherein the straight tongue 5 is situated and emerged from as shown in FIG. 4, FIG. 5, and FIG. 6. From the space, the straight tongue 5 emerges and protrudes perpendicularly out thereof. The straight tongue 5 has a width closely similar to the width of the end of the measure tape so the straight tongue 5 may be attached thereupon. This attachment is facilitated by the attachment of rivets on the end of the measure tape to a plurality of rivet holes 6 situated on the straight tongue 5. The plurality of rivet holes 6 traverses centrally through the straight tongue 5. The plurality of rivet holes 6 allow the present invention to easily slide along the end of the measure tape.

In the original embodiment, the present invention does not only comprise the rounded bottom 1, but also an angled bottom as well. Due to the angled bottom, the original embodiment comprises a pair of front flat areas and a pair of back flat areas, both of which are also perpendicular to the measuring tape and are exactly 1 inch apart from each other. When using the pair of back flat areas for measurements, 1 inch needs to be subtracted from the measured reading for an accurate measurement. Similar to the preferred embodiment, the original embodiment also comprises the pair of front round tabs 7, but the pair of front round tabs 7 are continuously connected to the pair of front flat areas in the original embodiment. Furthermore, the pair of front round tabs 7 is situated on top of the pair of front flat areas. The pair of front round tabs 7 in both embodiments are integrated for attaching the present invention to different objects to be measured. In the original embodiment, the present invention comprises a rear stopper tab to help the tape measure end piece to have a more even impact when the tape measure end piece meets the end of the measure tape. Both the rear stopper tab and the pair of front round tabs 7 are situated on the same plane. In the preferred embodiment, however, the pair of front flat areas, the pair of back flat areas, the back stopper tab along with a bottom tongue are removed to decrease the overall height and weight of the tape measure end piece. Furthermore, the removal of the aforementioned components allows the present invention to fully retract into the body of the tape measure.

In the original embodiment, the pair of front flat areas serves a similar role as the flat surface 8 of the pair of front round tabs 7. The pair of front flat areas gives the front profile of the present invention a large and flat expanded surface which helps stabilize the end of the measure tape for easier measuring when the end of the measure tape along with the present invention are pushed against an object. The tape measure end piece is designed to pass easily over uneven surfaces and to allow the user to make measurements in the same manner as he or she would with a standard measure tape without an attached end piece. The overall structure of the tape measure end piece and the ability of the tape measure end piece to travel over uneven surfaces are achieved with a very simple design. The present invention is intended to be used by trades people as well as by lay people.

There are many uses for the tape measure end piece including but are not limited to measuring shingled roof surfaces. Using the present invention, most roofs are able to be measured from the top of a ladder. With the present invention attached to the end of the measure tape, the end of the measure tape and the tape measure end piece can be slid up onto shingled roof surfaces with ease, allowing exact measurements from the ridge to the eaves of the house roof. Allowing the end of the measure tape to travel up a shingled roof has been addressed by other inventors before. Previous inventors attempted to attach wheels to the end of the measure tape. Other inventors attached a sled like object to the end of the measure tape. Both of these methods required attaching and detaching an object, which gives additional weight to the end of the measure tape and makes the end of the measure tape substantially heavier and difficult to control. Consequently, the end of the measure tape and the attached object travel in unexpected directions. The previous attachment methods and apparatuses tend to make the end of the measure tape to move in uncontrolled and undesired directions. These attachment methods and apparatuses need to be detached from the end of the measure tape for standard measurements of most objects.

The present invention has been designed to be very small and lightweight; the present invention is very easy and inexpensive to design and manufacture. The present invention can take measurements like the end piece of a standard measure tape as well as travel over uneven surfaces, including but are not limited to shingled roofs, decks, floors, lawns, etc. Moreover, the present invention does not need to be attached or detached to the end of the tape measure by the user. In both embodiments, the small overall structure and the rounded bottom 1 of the present invention create very little drag and allow the end of the tape measure along with the attached present invention to travel over the uneven surface in the intended direction with very little effort.

The present invention allows the end of the tape measure to take measurements in at least three different ways: 1) when the end of the tape measure and the tape measure end piece are pushed up against an object; 2) when the pair of front round tabs 7 is hooked onto the object; 3) and when the pair of back flat areas of the original embodiment or the rounded bottom of the preferred embodiment is hooked onto the object. In the present invention, the straight tongue 5 and the end of the tape measure are riveted with the tape measure end piece being able to slide back and forth exactly the thickness of the space in between the pair of front round tabs 7. With the present invention attached to the end of the measure tape, measurements will be made whether the end of the measure tape is pushed up against an object or the end of the measure tape is hooked onto the object via the pair of front round tabs 7. When making measurements with the pair of the back flat areas, 1 inch is to be subtracted to achieve a correct measurement. Measurements with the pair of the back flat areas or the rounded bottom 1 are longer and may not need to be precise measurements.

Although the invention has been explained in relation to its preferred embodiment, it is to be understood that many other possible modifications and variations can be made without departing from the spirit and scope of the invention as hereinafter claimed.

What is claimed is:

1. A tape measure end piece comprises:
   a rounded bottom;
   a straight tongue;
   a pair of front round tabs;

the straight tongue comprising a plurality of rivet holes;
the pair of front round tabs comprising a flat surface;
the straight tongue being positioned perpendicularly to the pair of front round tabs; and
the straight tongue being positioned tangent to the rounded bottom.

2. The tape measure end piece as claimed in claim 1, wherein the tape measure end piece is made from one piece of material.

3. The tape measure end piece as claimed in claim 2, wherein the rounded bottom, the straight tongue and the pair of front round tabs are continuously connected.

4. The tape measure end piece as claimed in claim 1 comprises,
the rounded bottom comprising an arced body and a slit; and
the slit traversing through the arced body.

5. The tape measure end piece as claimed in claim 4 comprises,
the slit being positioned under the straight tongue.

6. The tape measure end piece as claimed in claim 1 comprises,
the flat surface of the pair of front round tabs being flush with the outer lateral surface of the rounded bottom.

7. The tape measure end piece as claimed in claim 1 comprises,
the pair of front round tabs being separated by a space.

8. The tape measure end piece as claimed in claim 1 comprises,
the plurality of rivet holes traversing through the straight tongue.

9. A tape measure end piece comprises:
a rounded bottom;
a straight tongue;
a pair of front round tabs;
the straight tongue comprising a plurality of rivet holes;
the pair of front round tabs comprising a flat surface;
the straight tongue being positioned perpendicularly to the pair of front round tabs;
the straight tongue being positioned tangent to the rounded bottom;
the tape measure end piece being made from one piece of material;
the rounded bottom, the straight tongue and the pair of front round tabs being continuously connected; and
the plurality of rivet holes traversing through the straight tongue.

10. The tape measure end piece as claimed in claim 9 comprises,
the rounded bottom comprising an arced body and a slit; and
the slit traversing through the arced body.

11. The tape measure end piece as claimed in claim 10 comprises,
the slit being positioned under to the straight tongue.

12. The tape measure end piece as claimed in claim 9 comprises,
the flat surface of the pair of front round tabs being flush with the outer lateral surface of the rounded bottom.

13. The tape measure end piece as claimed in claim 9 comprises,
the pair of front round tabs being separated by a space.

14. A tape measure end piece comprises:
a rounded bottom;
a straight tongue;
a pair of front round tabs;
the straight tongue comprising a plurality of rivet holes;
the pair of front round tabs comprising a flat surface;
the straight tongue being positioned perpendicularly to the pair of front round tabs; and
the straight tongue being positioned tangent to the rounded bottom;
the tape measure end piece being made from one piece of material;
the rounded bottom, the straight tongue and the pair of front round tabs being continuously connected;
the plurality of rivet holes traversing through the straight tongue;
the rounded bottom comprising an arced body and a slit;
the slit traversing through the arced body; and
the flat surface of the pair of front round tabs being flush with the outer lateral surface of the rounded bottom.

15. The tape measure end piece as claimed in claim 14 comprises,
the slit being positioned under to the straight tongue.

16. The tape measure end piece as claimed in claim 14 comprises,
the pair of front round tabs being separated by a space.

* * * * *